United States Patent [19]

Kelley et al.

[11] 4,305,130

[45] Dec. 8, 1981

[54] APPARATUS AND METHOD TO ENABLE A ROBOT WITH VISION TO ACQUIRE, ORIENT AND TRANSPORT WORKPIECES

[75] Inventors: Robert B. Kelley, Kingston; John R. Birk, Peace Dale; Dana L. Duncan, Wakefield; Richard P. Tella, Ashaway; Laurie J. Wilson, Ashaway, all of R.I.

[73] Assignee: University of Rhode Island, R.I.

[21] Appl. No.: 43,197

[22] Filed: May 29, 1979

[51] Int. Cl.³ .............................................. G06F 15/46
[52] U.S. Cl. ...................................... 364/513; 318/640; 358/903; 364/478; 414/730; 414/737
[58] Field of Search ............... 364/107, 513, 474, 478, 364/559; 318/568, 640; 358/100, 101, 107, 139, 903; 414/730, 737, 627, 752, 267, 268, 274, 4, 5, 909

[56] References Cited

U.S. PATENT DOCUMENTS

| | | | |
|---|---|---|---|
| 3,804,270 | 4/1974 | Michaud et al. | 414/268 X |
| 3,888,362 | 6/1975 | Fletcher et al. | 318/640 X |
| 3,986,007 | 10/1976 | Ruoff, Jr. | 364/513 |
| 4,017,721 | 4/1977 | Michaud | 364/513 |
| 4,146,924 | 3/1979 | Birk et al. | 364/513 |
| 4,187,051 | 2/1980 | Kirsch et al. | 318/640 X |

Primary Examiner—Joseph F. Ruggiero
Attorney, Agent, or Firm—Thompson, Birch, Gauthier & Samuels

[57] ABSTRACT

A robot assembly for acquiring unorientated workpieces from a bin. A sensing system views the bin and collects data. A computer analyzes the data to determine candidate holdsites on the workpiece. The hand of the robot assembly then engages a workpiece at a selected holdsite. The workpiece is moved to a pose where the position and orientation of the workpiece are determined. After this determination, the workpiece may be disengaged, or moved to an intermediate or final goal site.

45 Claims, 12 Drawing Figures

APPARATUS AND METHOD TO ENABLE A ROBOT WITH VISION TO ACQUIRE, ORIENT AND TRANSPORT WORKPIECES

BACKGROUND OF THE INVENTION

After workpieces are made and before they are needed for final assembly, they are typically stored unoriented in bulk in tubs and boxes (bins). The workpieces must be oriented in order to be fed properly into machines.

There are a wide variety of assembly line operations involving the handling and processing of such individual workpieces. In such operations, attempts have been made in implementing automated workpiece handling systems, which involve as a necessary initial step, the acquisition of individual workpieces from a supply bin. Because workpieces are usually randomly oriented in the bin, each acquired workpiece must be viewed and properly oriented before it can be subsequently processed. Viewing is normally accomplished by a video camera which generates a video signal representative of the actual orientation of the acquired workpiece. If necessary, appropriate corrections are made to the orientation of the acquired workpiece before further processing. See for example U.S. Pat. No. 3,804,270.

The known robot systems have generally failed to gain commercial acceptance because of their inability to handle randomly oriented workpieces in a reliable and consistent manner. In general, additional workpiece handling systems have been necessary to orient the workpiece for the robot.

SUMMARY OF THE INVENTION

The present invention is directed to a robot system and a method of using the same, which system acquires a workpiece from randomly arranged workpieces by examining data which matches holdsites and places the acquired workpiece at a goal site. The system does not require complete knowledge of the position and orientation of a workpiece in a bin. The system broadly includes a robot assembly having an arm and hand (gripper) for sequentially engaging the workpieces, a sensing system for collecting data about the workpieces in different states and a computer which communicates with both the assembly and the sensing system and controls the movement of the robot assembly.

The robot assembly includes a hand to engage the unoriented workpieces and an arm to translate and rotate the hand.

In a preferred embodiment the transfer of a workpiece from a bin to a final goal site embodies a plurality of steps after the robot system has been calibrated and initialized. In initialization a base coordinate system is established, an image coordinate system is established and certain poses and trajectories (spatial relationships of the hand to workpiece to supply bin and goal sites and hand and/or workpiece to supply bin and goal sites) are established.

To acquire a workpiece from the bin, the imaging system views the bin and candidate holdsites are established. These holdsites are potential surfaces on the workpiece which the hand can engage. The hand moves into contacting engagement with a holdsite on a piece and engages the workpiece. The workpiece is then removed from the bin.

Next, the position and orientation of the workpiece in the hand is determined. The hand moves to a predetermined position and orientation, the presentation pose and the imaging system views the workpiece.

The hand is now in the presentation pose. Features are extracted from the image data. The features are then compared with features obtained with a workpiece at standard position and orientation. The pose of the workpiece is computed. The workpiece is then moved to an intermediate goal site with compensation being made for workpiece rotation and translation. After transferring the workpiece to an intermediate goal site, it can be moved through a fixed trajectory to a final goal site.

In one aspect the invention comprises a robot assembly (arm and hand), the arm adapted for movement through at least two linear orthogonal axes and through at least two rotary axes; a video camera to image workpieces in a bin and a computer for control and computation. The camera views the bin. A binary image of the workpieces in the bin is obtained by setting all pixels whose brightness is below a threshold to zero, the rest to one. Solid regions (of ones) corresponding to the surface area of the hand are defined as candidate holdsites, and one holdsite of the holdsites is transformed into base coordinates. The arm is moved and the hand descends and contacts the holdsite thus engaging the workpiece.

In another aspect of the invention, an acquired workpiece is moved to a presentation pose where it is viewed by a video camera. An image of the workpiece is obtained and compared with a pre-established image. The pose of the workpiece is computed. The workpiece is transferred to an intermediate goal site and then moved through a fixed trajectory to a final goal site.

In the preferred embodiment, the one and the other aspects of the invention are combined.

DESCRIPTION OF THE PREFERRED EMBODIMENT

Figures 1, 2:
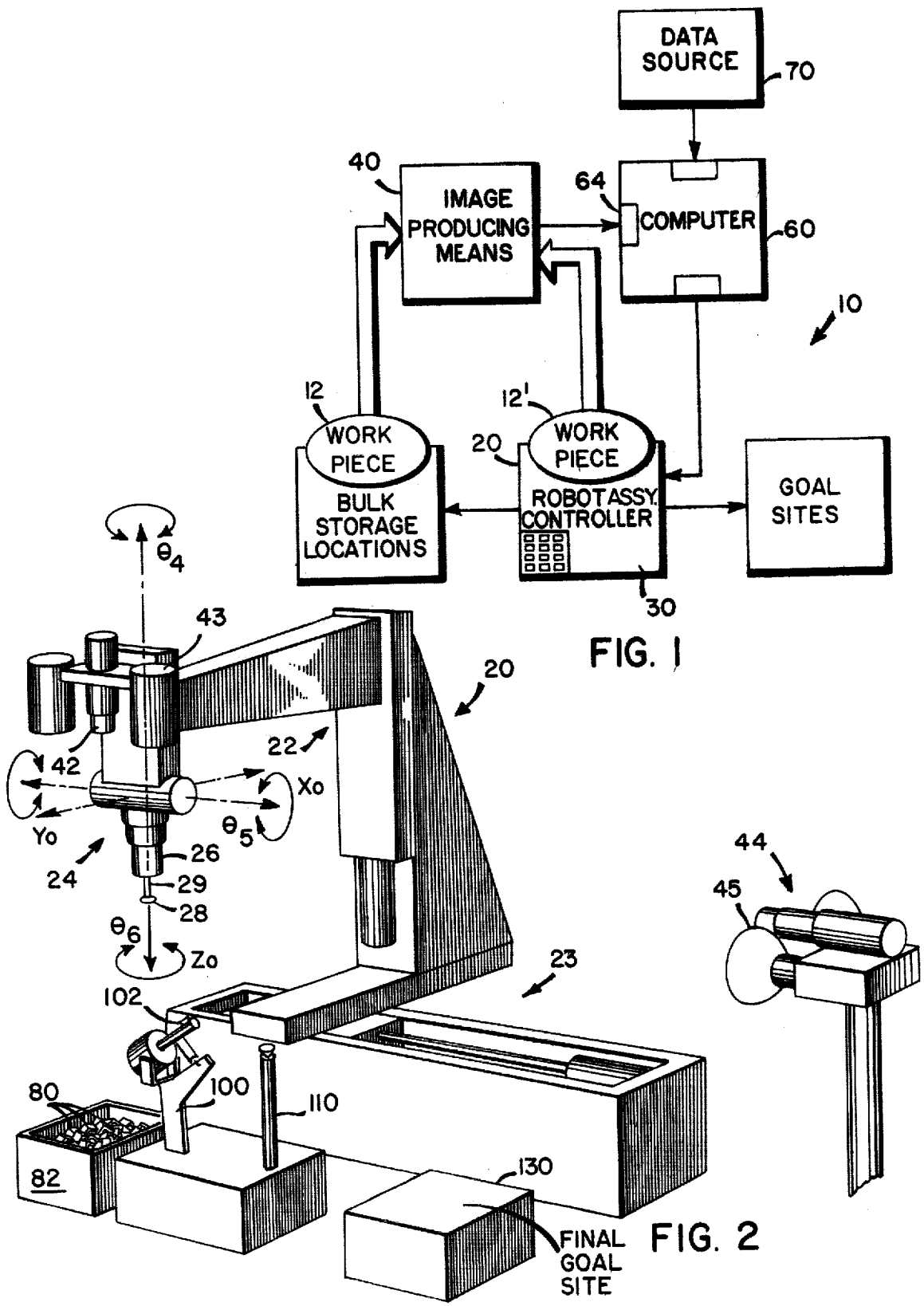
FIG. 1 is a functional block diagram of a robot system embodying the invention.
FIG. 2 is a schematic illustration of an arm, wrist and hand assembly with translational and orthogonal axes defined thereon.

A robot system 10 embodying the invention is shown functionally in FIG. 1 and comprises robot assembly 20; an imaging system 40, a computer 60 and a data source 70. Referring to FIG. 2, the robot assembly transfers workpieces 80 from a supply bin 82 to one of two intermediate goal sites 100 and 110, respectively; and to a final goal site 130.

THE COMPUTER

The control of the computer 60 is accomplished through the instructions. The instructions are written in terms of the particular mode of operation desired. The computer thus has stored in its memory, the programs or routines corresponding to each mode or operation of the computer. It is well known to those skilled in the art, that the computer comprises suitable control, storage and computational units for performing various arithmetic and logical functions on data which it processes in digital form. Any standard computer language consistent with the capability of the computer can be used for the instructions. All subroutines are not described in detail, since they can be written in any desired notations, formats or sequence, depending upon the particular computer being utilized, computer language, etc. Programs and instructions described before are put in terms of structural flow. When necessary and applicable for purposes of the invention, individual programs are described. For the computer 60 (Computer Automation Model LSI-2), the manufacturer's Handbook 91-20400-00A2, October 1974, sets forth the necessary program which includes the sequence of internal interconnections which have been added by the preparation and loading of the program into the internal memory of the computer.

The computer 60, as shown in FIG. 1, interfaces with a robot assembly controller 30 through an interface 62 such as a 16 bit I/O Module (CAI Model 13213-00). The imaging system 40 comprises two video cameras 42 and 44 (FIG. 2) both of which interface with the computer 60 through an interface 64 such as a direct memory access board. The computer has a sixteen bit wordlength, software floating point arithmetic and 32K words of memory. All image processing and robot assembly computations are performed in the computer. Arm joint servoing is effected by a keyboard 32.

Programs are written in both FORTRAN and assembly language modules. The assembly language modules are used to implement the interface handlers and to perform manipulations which are not suited for FORTRAN such as byte (eight bit) mode arithmetic and bit-based computations.

Approximately 12K words are available for application dependent programs. The image provided by the imaging system occupies 8K words (16K bytes) for gray scale processing. About 12K words are needed to contain the operating system and the library of FORTRAN support routines.

ROBOT ASSEMBLY

Referring to FIG. 2, the robot assembly 20 consists of the arm 22, and hand 26, and possesses six degrees of freedom about 3 linear orthogonal axes (X, Y, Z) and 3 rotary axes ($\theta 4$, $\theta 5$, $\theta 6$). For purposes of the preferred embodiment the arm is defined as including a wrist 24. The linear axes of the arm 22 are defined by three positioning tables, such as Anorad positioning tables 28. As is well known, the position of these tables along the three axes is measured by a rotary encoder which produces a dual channel sinusoidal wave and has a resolution of 0.001 inch per encoder count. The controller (servo control system not shown) embodied in the tables, interfaces with the computer 60 via a sixteen bit I/O board. The digital interface accpets the following commands:

1. Home Signal—causes all axes to move in a negative direction until a home switch is sensed at which time the encoder counter is set to zero.
2. Axis select—selects one of the six axes.
3. Read/Write—determines if position should be read or written to the controller.
4. Position command—these signals indicate absolute position in binary.
5. Shift line—determines which byte is being written or read.
6. Start—initiates reading or writing of position information.
7. Ready—indicates when all axes are in position.
8. Reset—resets all controller logic.
9. Limit switch interrupt—indicates that an axis hit a limit.
10. Limit switch word—decodes which axis hit a limit.

Further, the front panel of the controller includes an LED readout that reflects the current position of each axis. A ready and limit indicator are also mounted on the front panel for each axis.

The wrist 24 adapted for motion about the three rotary joint axis is secured to arm 22. The 04 axis rotates through 286°; the 05 axis through 233° and the 06 axis through 310°. Encoder units have a two channel, 250 pulses per revolution, sinusoidal wave output. The controller 30 multiplies the encoder output by four, which results in an angular resolution of 0.36 degrees per pulse. The limit switches associated with the axes of the wrist communicate with and are controlled by the controller 30 associated with the tables. The specifications for the particular arm and wrist are described in "General Methods to Enable Robots with Vision to Acquire, Orient and Transport Workpieces", Fourth Report, J. Birk et al., Appendix 5, presented at the proceedings Eighth International Synposium on Industrial Robots, Stuttgart, Germany, May 30-June 1, 1978, which Report including Appendices is hereby incorporated by reference in this application in its entirety.

Depending from the wrist 24, is a hand 26. The hand 26 is described in detail in Appendix 7 of the above-referenced report. The hand terminates in a surface-adapting vacuum cup 28. It can acquire a large variety of randomly-orientated workpieces having surfaces which will allow a vacuum cup seal. Although other types of grasping mechanisms could be used, such as jaws, fingers, electromagnets, etc., vacuum cups are preferred. The vacuum cups do not occlude the workpiece during the grasping process in that they need only one contact surface for holding. Secondly, vacuum cups can be interchanged in the hand mechanism allowing a variety of vacuum pressures and cup diameters, depending upon the workpiece to be acquired. Basically, the vacuum cup 28 is flexibly secured, such as by a compression spring 29 to a piston-cylinder arrangement within the hand 26. The compression spring 29 allows flexibility of the vacuum cup in selecting randomly-orientated workpieces. Once a workpiece is engaged, the compression spring-vacuum cup is withdrawn into the wrist and locked.

Figure 3:
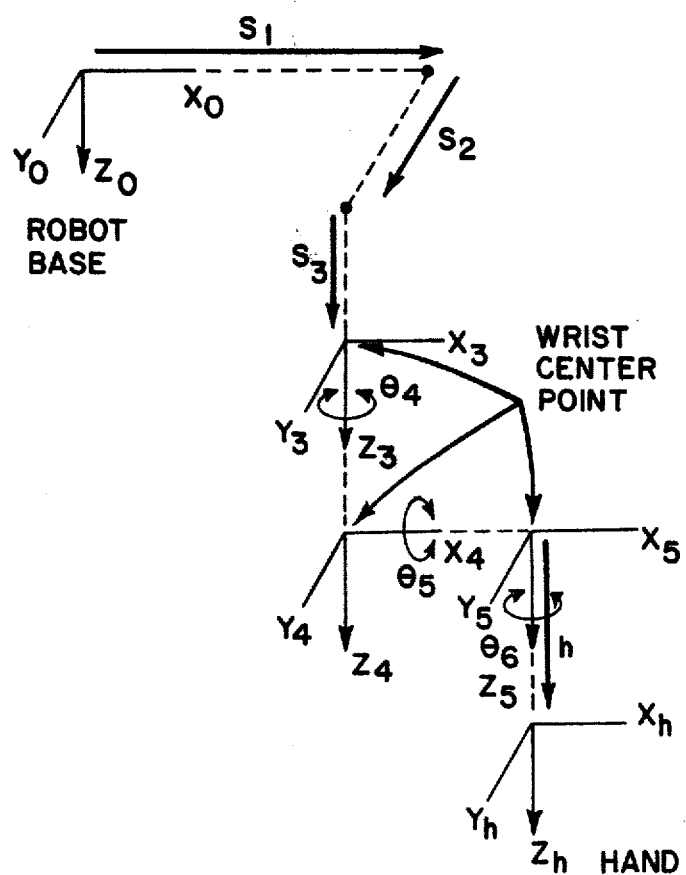
FIG. 3 illustrates the relationship between the base coordinate system of the robot assembly.

FIG. 3 illustrates the relationship between base coordinate system of the robot assembly and the hand coordinate system in terms of the arm joint coordinate system. Three joints are linear orthogonal sliding joints. Their displacements are denoted by the parameter values $S_1$, $S_2$, and $S_3$. Three joints are rotary. The rotary axes intersect at a point (the wrist center). Their rotations are denoted by the parameter values $\theta_4$, $\theta_5$ and $\theta_6$. The hand (vacuum cup) is displaced from $\theta_5$ axis by a fixed distance denoted by the parameter value h. The origin of the base coordinate system is defined to be at the wrist center when the robot assembly is initialized. Displacements in the $X_0$ direction correspond to $S_1$, displacements in the $Y_0$ direction to $S_2$ and displacements in the directions $Z_0$ to $S_3$.

The coordinate transformation matrix relating coordinate system 3 (the wrist center) into the base coordinate system, designated by "0" is:

$$^0T_3 = \begin{bmatrix} 1 & 0 & 0 & S_1 \\ 0 & 1 & 0 & S_2 \\ 0 & 0 & 1 & S_3 \\ 0 & 0 & 0 & 1 \end{bmatrix}$$

The three rotary joints are designed so that the three axes of rotation intersect at a point, the wrist center. The three coordinate transformation matrices which describe the individual joint rotations are $$^3T_4 = \begin{bmatrix} C\theta_4 & -S\theta_4 & 0 & 0 \\ S\theta_4 & C\theta_4 & 0 & 0 \\ 0 & 0 & 1 & 0 \\ 0 & 0 & 0 & 1 \end{bmatrix}, +\theta_4 \text{ ccw about } Z_3,$$

$$^4T_5 = \begin{bmatrix} 1 & 0 & 0 & 0 \\ 0 & C\theta_5 & S\theta_5 & 0 \\ 0 & -S\theta_5 & C\theta_5 & 0 \\ 0 & 0 & 0 & 1 \end{bmatrix}, +\theta_5 \text{ cw about } X_4,$$

$$^5T_h = \begin{bmatrix} C\theta_6 & -S\theta_4 & 0 & 0 \\ S\theta_6 & C\theta_4 & 0 & 0 \\ 0 & 0 & 1 & h \end{bmatrix}, +\theta_6 \text{ ccw about } Z_5,$$

where $C\theta$ = cosine $\theta$, $S\theta$ = sine $\theta$.

Thus the base-hand transformation matrix is given by $$^0T_h = \begin{bmatrix} C\theta_4 C\theta_6 - S\theta_4 C\theta_5 S\theta_6 & -C\theta_4 S\theta_6 - S\theta_4 C\theta_5 C\theta_6 & -S\theta_4 S\theta_5 & S_1 - h^*S\theta_4 S\theta_5 \\ S\theta_4 C\theta_6 - C\theta_4 C\theta_5 S\theta_6 & -S\theta_4 S\theta_6 + C\theta_4 C\theta_5 C\theta_6 & C\theta_4 S\theta_5 & S_2 + h^*C\theta_4 S\theta_5 \\ -S\theta_5 S\theta_6 & -S\theta_5 C\theta_6 & C\theta_5 & S_3 + h^*C\theta_5 \\ 0 & 0 & 0 & 1 \end{bmatrix}$$

Figure 4:
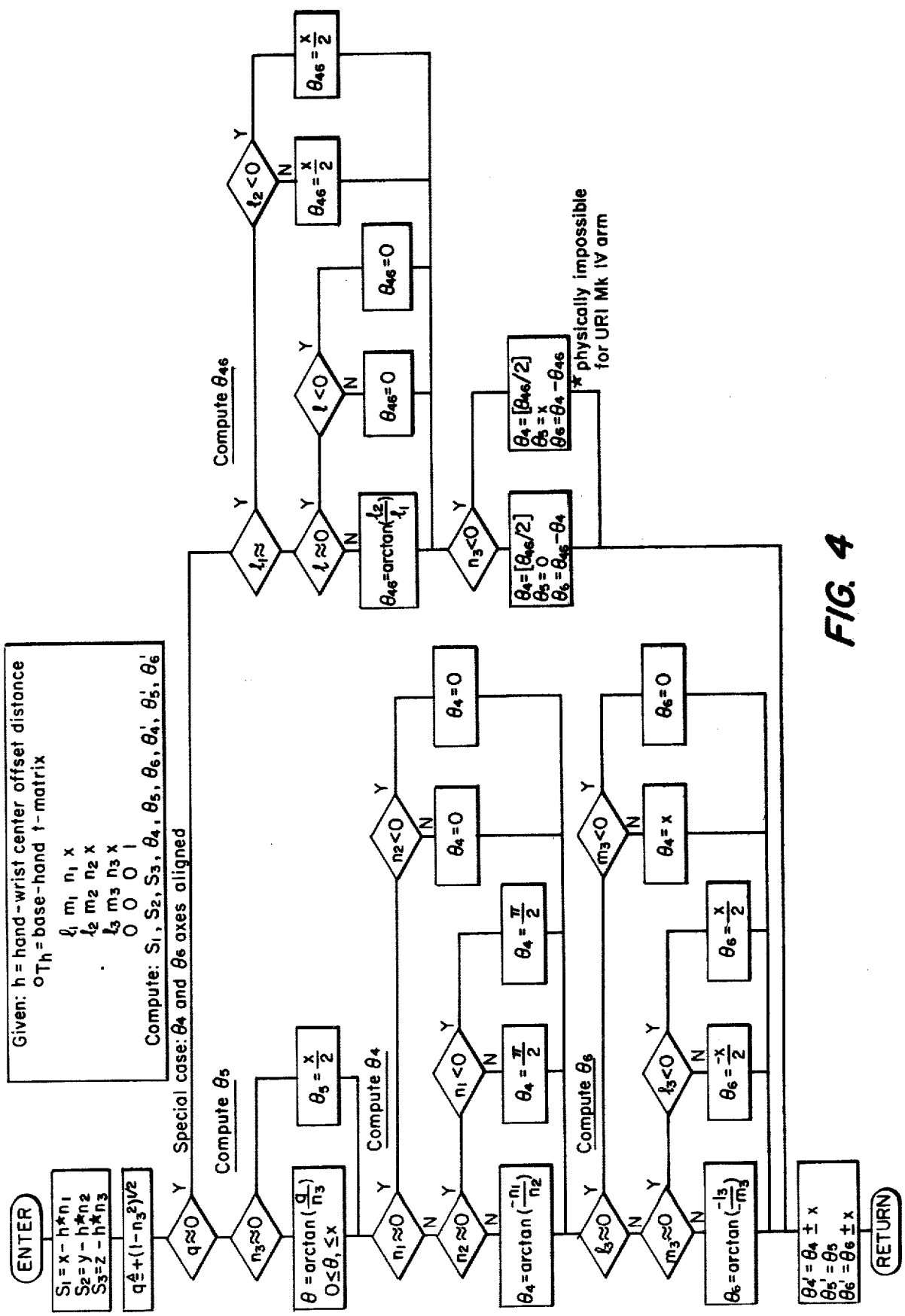
FIG. 4 is a flowchart of a program for an arm joint solution for the robot assembly of FIG. 3.

A procedure for obtaining an arm joint solution is given in flowchart form in FIG. 4. Given the base-hand transformation matrix $$^0T_h = \begin{bmatrix} l1 & m_1 & n_1 & x \\ l2 & m_2 & n_2 & y \\ l3 & m_3 & n_3 & z \\ 0 & 0 & 0 & 1 \end{bmatrix}$$

and the value of the parameter h, this procedure solves for the three sliding joint values
$S_1$, $S_2$, $S_3$
and for the two sets of three rotary joint angles values
$\theta_4$, $\theta_5$, $\theta_6$ and $\theta'_4$, $\theta'_5$, $\theta'_6$.
These two sets of angles are related by
$\theta_4 = \theta_4 \pm 180°$,
$\theta_5 = -\theta_5$,
$\theta_6 = \theta_6 \pm 180°$, where $-180° < \theta_4$, $\theta_5$, $\theta_6 \leq 180°$ and both sets correspond to the same $^0T_h$. Hence, both will achieve the same hand coordinate system pose. A choice between the two joint angle sets can be made based upon physical considerations such as using the set of arm joint values which minimizes the time to move and arm joint values which can actually be achieved.

The structure of the flowchart presented in FIG. 4 exhibits two major branches. The left branch corresponds to the general case where two sets of angle values are obtained. The right branch corresponds to the common, degenerate case obtained whenever the hand is pointing straight down, $\theta_5 = 0$. This degeneracy occurs because under this kinematic condition, the axes for $\theta_4$ and $\theta_6$ are collinear. Hence, only the combined value of rotation angle, $\theta_{4,6}$, can be determined and many assignments of $\theta_4$ and $\theta_6$ are possible. There is also a degeneracy for $\theta_5 = 180°$. This corresponds to the hand pointing straight up. The two conditions are summarized below as $\theta_5 = 0 \quad \theta_4 + \theta_6 = \theta_{4,6}$, and $\theta_5 = 180° \quad \theta_4 - \theta_6 = \theta_{4,6}$

THE CAMERA SYSTEM

Figure 5:
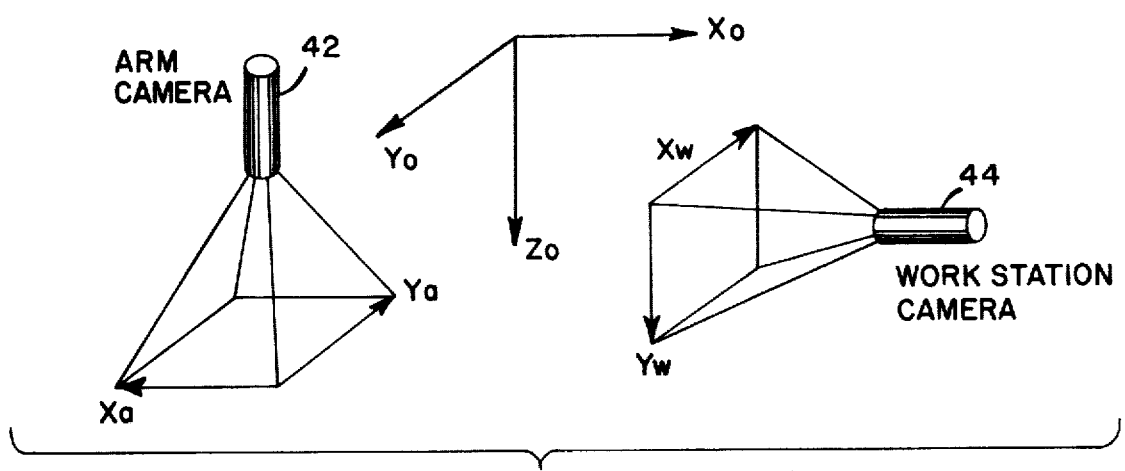
FIG. 5 is a schematic illustration of the relationship between the base coordinate system and the image cordinates of the video cameras.

Referring to FIGS. 2 and 5, the video camera 42 is secured to the arm 22 and its optical axis (line of sight) is parallel to the Z axis. Illumination of the workpiece is provided by lamps 43.

The video camera 44, the workstation camera, is rigidly mounted and faces parallel to the $X_0$ axis. Both cameras are aligned with the robot assembly axes of motion x,y and z to simplify the transformations from camera to robot coordinates, as shown most clearly in FIG. 5. Illumination of the workpiece symetrical about the optical axis is provided by lamps 45.

The first camera 42 is used to select holdsights on workpieces 80 in the bin 82. Because it is mounted on the arm it can also be used to view workpieces nearly anywhere in the bin 82 and goal sites 100, 110 and 130. The second camera 44 is used to compute the workpiece presentation pose in the hand 26.

The relationship between the picture measurements (expressed in pixels) and hand pose (expressed in encoder counts of joint values) must be determined. By aligning the optical axes with the arm axes, the relationship between the camera measurements and the hand pose is simplified.

As will be described after obtaining a view of the bin and selecting a holdsite, the arm is positioned such that the hand is vertically above the holdsite. This position is easily achieved because movements of the robot along the $X_0$ or $Y_0$ axis correspond to movements of the picture image along the $X_a$ or $Y_a$ axis, respectively. Given this alignment (FIG. 5), the following camera parameters are required:

1. The conversion factors (encoder counts/pixel) in the X and Y directions (Cepx, Cepy). Because the camera has a square lattice of sensors, the arm 22 has equal resolution in the $X_0$ and $Y_0$ directions, and the $X_0Y_0$ and $X_aY_a$ planes are nearly parallel, these two conversion factors should be equal.

2. $x_0$, $y_0$, $x_a$, and $y_a$ are coordinates of a vertical line passing through the hand ($x_{00}$, $y_{00}$, $x_{a0}$, and $y_{a0}$) and a visible object.

The robot assembly values X,Y that position the hand over a specific holdsite with image coordinates $x_h$, $y_h$ are obtained as $$x = (x_h - x_{a0})C_{epx} + x_{00}$$

$$y = (y_h - y_{a0})C_{epy} + y_{00}$$

Arm camera 42 alignment is achieved by a rotation about the camera axis.

A semiautomatic alignment procedure is given below:
 a. Position a calibration piece in the bin, such as, a white circular chip on a black background.
 b. Move the arm to the bin view pose.
 c. Move the arm to four poses that differ from the bin view pose, two along $X_0$ and two along $Y_0$. Compute displacement of the center of gravity (CG) of the chip.
 d. If the camera is aligned such that movement in $x_0$ only displaces the CG in $x_a$ and movement in $y_0$ only displaces the CG in $y_a$, then skip step e; otherwise
 e. Rotate the camera slightly. Direction of rotation can be obtained from inspection of CG trajectories. Go back to step b.
 f. The camera is aligned. The same procedure of step c is repeated but with 8 points in each direction. A regression algorithm over the CG's trajectory will give the conversion factors in each direction ($C_{epx}$, $C_{epy}$).

Steps b, c, and f are automatic. Placement of the calibration piece, rotation of the camera, and decisions about alignment are operator tasks. On a TV monitor, the operator can also reject poor images or ones with only parts of the piece. A typical trajectory for the center of gravity is shown in Table I. Joint coordinates and image coordinates of the vertical line which passes through the chip are obtained as follows:

1. Position the arm in the bin view pose and record the CG values of the calibration chip as $x_{a0}y_{a0}$.

2. Under Keyboard Control, position the arm will the vacuum cup touching the center of the chip. The $x_0$ and $y_0$ joint values are recorded as $x_{00}$ and $y_{00}$.

TABLE I

Typical CG Trajectories for the Arm Camera After Alignment Procedure

| Move in $X_0$ | | Move in $Y_0$ | |
|---|---|---|---|
| $x_a$ | $y_a$ | $x_a$ | $y_a$ |
| 084 | 0.56 | 050 | 089 |
| 076 | 056 | 050 | 081 |
| 067 | 056 | 050 | 073 |
| 059 | 056 | 050 | 064 |
| 050 | 056 | 050 | 056 |
| 042 | 056 | 050 | 048 |
| 033 | 056 | 050 | 039 |
| 025 | 056 | 050 | 031 |
| 017 | 056 | 050 | 022 |

The work station camera 44 is used to obtain a view of the workpiece in the hand. From this view a set of features is extracted and compared with a similar set for a taught presentation pose. One of the finite number of states of the workpiece in the hand is recognized. The difference between the position and orientation of the two feature sets can be converted into a translation and a rotation on the plane on which the workpiece is held. The computation of workpiece translation and rotation in the hand is simplified when the hand plane is parallel to the image plane.

To achieve this situation for the current system architecture, the following alignments are selected. At the presentation pose, the hand is to point along the positive $X_0$ axis and the holding surface is to be parallel to the $Y_0Z_0$ plane. The image plane is also to be parallel to the $Y_0Z_0$ plane. Details of this mounting can be seen in FIG. 6.

As with the arm camera, computations are simplified if the $X_w$ and $Y_w$ axes of the image are aligned with the $Y_0$ and $Z_0$ axes of the robot. In this case only the two conversion factors relating encoder counts to pixels need be known. An absolute reference is not needed since the only translation information required is the shift in workpiece location between instruction phase and execution phase.

The semiautomatic alignment procedure for the workstation camera 44 is given below:
 a. With the arm at an initial estimate for the presentation pose, place the calibration poker chip in the hand.
 b. The arm is moved on $Y_0Z_0$ plane until the CG of the chip is in the center of the field of view.
 c. Move the arm to two poses that differ only in the $x_0$ coordinate.
 d. If the two poses indicate alignment (computed CG's at these poses are the same) several additional poses along $X_0$ are collected. If all these poses confirm alignment, skip step e.
 e. If not, the operator corrects camera alignment (requires alignment in the two degrees of freedom which adjust the direction of the camera axis). Go back to b.
 f. Follow a procedure similar to that specified for the arm camera to align camera rotation about its axis unitl $X_w$ and $Y_w$ are aligned with $Y_0$ and $Z_0$.
 g. The arm is moved through several poses along $Y_0$ and then along $Z_0$. The conversion factors (encoder counts/pixel) are obtained using linear regression. Typical CG trajectories are similar to those shown for the arm camera.

OPERATION

Briefly, the hand 26 descends into the bin 82 to acquire a workpiece 80. After the workpiece has been acquired, the arm 22 and wrist 24 are moved such that the arm is held in the presentation pose (FIG. 3). After the position of the workpiece 80 has been verified it is moved either to an intermediate goal site (FIGS. 7 and 8) or a final goal site.

Prior to the actual operation of the robot system for the transportation of the workpieces from the bin to a goal site, the computer must be initialized.

This initialization is divided into the instruction phase and the execution phase. The instruction phase has two segments. The first segment consists of those initialization activities which need only be performed once regardless of how many different workpieces are processed. The second segment of the instruction phase is workpiece-related and must be repeated for each different workpiece.

In the first segment of the instruction phase, there are three activities: (a) initializing the robot assembly; (b) calibrating the imaging system; and (c) specifying poses (which are a function of the system architecture).

The robot assembly is initialized by the following program which moves the arm 22 to its home switches (X, Y, Z,) and the wrist 24 to its negative limit switches; and from there to a pre-assigned offset pose with all encoders set to zero. The center of the wrist (where the three axes intersect) at this pre-assigned pose is the origin of the base coordinate system.

As discussed above, the imaging system consists of two cameras 42 and 44. The procedure for aligning the cameras with the robot assembly axes has been previously explained.

Four poses are specified during the first segment of instruction: the presentation pose; the bin view pose; the descent pose; and the supply bin drop-off pose. These poses are specified by an operator moving the robot assembly/via the keyboard 32. After placement of the arm at each of these poses, the arm joint values are read by the computer and stored.

Figure 6:
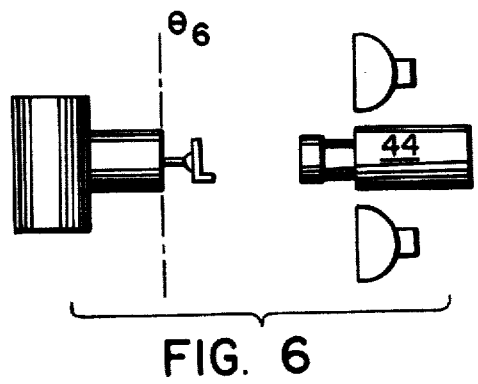
FIG. 6 is a schematic illustration of a workpiece held in the presentation pose.

In the presentation pose, the workpiece is presented to the work station camera (FIG. 6).

The bin view pose is the arm configuration used to take a picture of the bin with the arm camera 42 positioned over the center of the bin.

The descent pose is the pose above the bin to which the arm rapidly moves just prior to moving downward to grasp a workpiece. The height (Z value) of this pose is specified during instruction. Horizontal locations (X and Y values) are a function of which workpiece is in the bin selected. For the descent pose, the wrist points downwardly toward the bin.

The supply bin drop-off pose is used to return a workpiece which could not be processed such as returning from an intermediate goal site. The operator moves the arm from a goal site back to a position over the bin.

The second segment of instruction phase consists of seven activities:
1. Specification of hand parameters
2. Specification of the bin floor pose
3. Goal site specification(s)
4. Specification of goal to workpiece relationships
5. Specification of hand to workpiece relationships
6. Appearance calibration
7. Verification analysis; if necessary for a specific workpiece.

All of these activities are workpiece related and therefore must be repeated for each different workpiece.

The diameter of the hand vacuum cup 28 must match the requirements of the workpiece. It must not be larger than accessible surface areas. Yet it must be large enough to support the piece against gravity and acceleration forces. The minimum cup diameter necessary to support the piece against gravity may be computed using the following equation:

$$D_c = 2(w/\pi v)^{\frac{1}{2}}$$

where $D_c$ = vacuum cup diameter (inches), w = weight of the piece (pounds), and v = vacuum (psig). Once the cup diameter is specified, the minimum size (in pixels) of a holdsite in the bin image may be computed using the following equation:

$$D_i = D_c C$$

where $D_i$ = diameter of holdsite (pixels) and C = conversion factor from pixels/inches for the arm camera at the bin view pose. The distance from the $\theta_6$ endplate (end of wrist FIG. 6) to the tip of the cup when the hand is locked must be specified. This parameter is needed to control hand pose using arm joints. The hand coordinate system origin is at the center of the vacuum cup gripping surface.

The pose of the bin floor is specified to allow pieces very close to the bin floor to be acquired while preventing the vacuum cup from attempting to pick up the bin itself. The bin floor pose is specified relative to the tip of the vacuum cup when the hand is unlocked and must be respecified whenever the vacuum cup is changed. This pose is specified under Keyboard 32 control by moving the hand until it makes contact with the bin floor, the wrist is pointing downward and the hand is unlocked. The Z axis coordinate is stored as $Z_b$. During execution the arm is inhibited from moving to or beyond $Z_b$ during the process of acquiring a workpiece from the bin.

After the workpiece 80 has been verified at the presentation pose, it may be deposited at a final goal site by the robot assembly. Many times, workpieces are required to be placed in hostile enviroments, extreme heat, corrosive vapors, etc., or where physical access is restricted by structures in the work space. Also, the workpiece may not be properly oriented. Therefore, in many situations, it may be desirable to transfer the workpiece to an intermediate goal site, from where it is finally transferred by another device to a final goal site (workstation). For a fuller understanding of the present invention intermediate goal sites are described.

Figure 7:
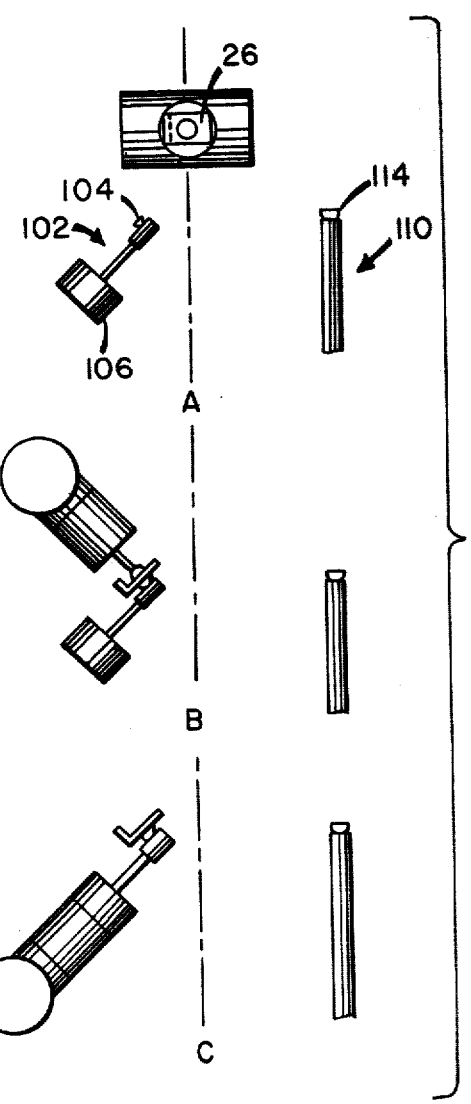
FIGS. 7 and 8 illustrate alternative intermediate goal sites.
Figure 8:
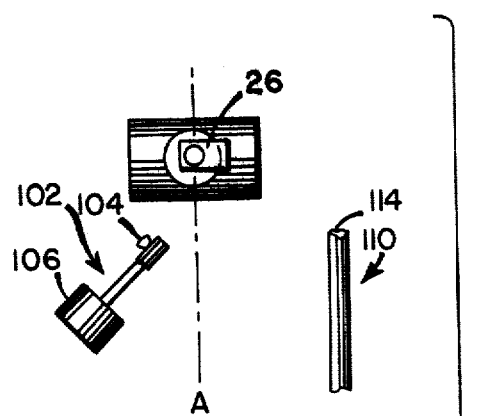

Referring to FIGS. 1, 7 and 8, there are two intermediate goal sites on which the hand can deposit oriented workpieces. The first goal site is a vacuum cup at the end of an insertion tool 102. The second goal site is a vacuum cup on a regrasping station 110. Since vacuum cups are a function of the workpiece, so are the poses of these goal sites. The insertion tool 102 simply comprises a vacuum cup 104, and housing 106. The housing 106 is structured such that the hand 26 is telescopically received in the housing 106 and the vacuum cup 28 locks to the housing 106. As shown in FIG. 7, the assembly 20 carries the tool 102 with it. The gripping station 110 is simply a fixed post 112 with a vacuum cup 114 secured to its top.

Intermediate goal site specification is performed by moving the robot assembly with the keyboard until the hand vacuum cup 28 is aligned with the intermediate goal site vacuum cup of the insertion tool 102. The wrist is pointed vertically downward and the hand is locked. Once the cups are aligned, the arm joint values are read by the computer and the base-hand t-matrix, $^0T_h$, is computed. The base-goal t-matrix, $^0T_g$, is defined to equal $^0T_h$, at this pose.

To compute the pose of a workpiece relative to the robot hand, to the intermediate goal sites and to the terminal goal site, there must be a coordinate system affixed to the workpiece. This affixment is arbitrary. Drawings of the workpiece may be used to define an affixment. For this robot system, the workpiece coordinate system is affixed by definition of its relationship to one of the fixed coordinate systems: an intermediate goal site or terminal goal site. This relationship is then used to compute the relationships with the other coordinate systems.

A workpiece is placed on the insertion tool 102. A workpiece coordinate system is affixed to the workpiece by defining the coordinate systems of the workpiece and the goal site to be coincident. Thus, for any workpiece placed on the insertion tool, the workpiece pose is the same. Because the workpiece pose is known, the relationships between the workpiece, the hand, the regrasping station and the terminal goal site are determined. This is done by grasping the workpiece with the hand when the workpiece is in a known pose and by moving the workpiece from its (definition) pose on the insertion tool to the regrasping station and the terminal goal site.

First, the robot hand-workpiece relationships are obtained for the workpiece on the insertion tool goal site. The hand is brought to grasp the workpiece (with the hand locked in retracted position). The hand-workpiece relationship is computed from the robot arm joint values. Similarly, for each of the other distinct surfaces on which the workpiece can be held and placed on the insertion tool goal site, the robot arm joint readings are obtained and these hand-workpiece relationships are computed.

Next, the hand attaches to the insertion tool 102 and transfers the workpiece to the terminal goal site 130. The robot arm joint readings are used to measure the change in the pose of the workpiece. This permits the terminal goal-workpiece relationship to be computed. The insertion tool 102 is then used to transfer the workpiece to the regrasping station 110. The regrasping station-workpiece relationship is computed from the change in arm joint values.

Finally, the insertion tool 102 is returned to its bracket and the hand brought to grasp the workpiece at the regrasping station 110. Reading the arm joint values allows the robot hand-workpiece relationship to be computed for placements at the regrasping station in analogy to placements on the insertion tool. This procedure results in deriving all the required workpiece pose relationships by using the robot arm as the measuring device.

Figure 10:
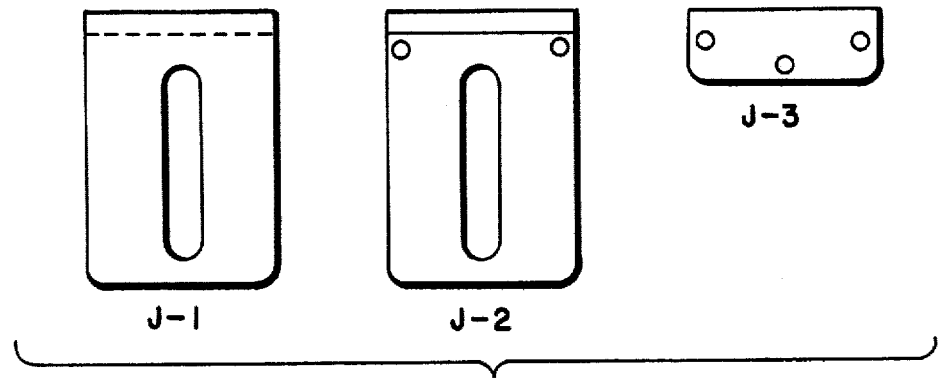
FIG. 10 are views of a workpiece in various presentation poses.

For each surface on which the piece may be held, while the piece is on either of its goal sites, a hand-workpiece transformation is defined. More particularly, using the keyboard 32, the robot assembly is moved so the hand can hold a surface of the workpiece, when it is also held at a goal site. The arm joint values are then input and the base-hand t-matrix, $^0T_{hj}$, is computed. From the following relation, the $j^{th}$ hand-workpiece t-matrix, $^{hj}T_w$, can be computed:

$$^{hj}T_w = {^0T_{hj}}^{-1}\, {^0T_g}\, {^gT_w} \quad j=1,\ldots,J$$

where the appropriate $^0T_g$ and $^gT_w$ are used. The specification process is repeated for each of the J ways to hold the workpiece. In the preferred embodiment the workpiece 80 (a drapery bracket) is held by the hand three ways, see FIG. 10. After an $^{hj}T_w$ has been specified, the robot assembly is translated to a thru pose near the goal site using the keyboard. The base-workpiece t-matrix, $^0T_w$, at the thru pose is then computed and stored. The thru pose is specified to guarantee that the approach and departure of the workpiece from each of the two sites is collision free.

Appearance calibration and verification analysis involve computing image features necessary to determine orientation in the hand. They are performed together for each hand-workpiece relation to avoid unnecessary workpiece handling at the goal sites. After data is collected at the presentation pose, if required, a verification pose is specified by moving the robot assembly, under keyboard control, to some desired verification pose and reading the arm joint values. The purpose of the verification analysis is to verify orientation classification decisions when necessary during execution; that is, to resolve possible orientation ambiguities. Therefore, the verification pose is selected so that the workpiece image contains sufficient information to discriminate between ambigious presentation poses the images associated with different hand-workpiece relationships (orientations). During execution, if orientation is correctly classified at the presentation pose, then the image feature computed at the verification pose should match the feature computed during instruction at the verification pose.

The steps in the appearance calibration and verification analysis are as follows:

1. The robot assembly moves to the goal site via the $j^{th}$ thru pose, and grasps the workpiece with the $j^{th}$ hand-workpiece relationship.

2. While holding the workpiece, the assembly moves to the presentation pose.

3. A binary image of the workpiece is formed using the work station camera and the appearance calibration features are computed and stored.

4. (Optional) The operator moves the arm to a verification pose while watching a TV monitor.

5. (Optional) A binary image of the workpiece is formed using the work station camera and a verification feature is computed.

6. (Optional) The base-workpiece relationship at the verification pose is computed so that it may be restored during execution for verification.

$$(^0T_w)i = (^0T_{hj})\,^{hj}T_w$$

7. The assembly moves to the goal site via the $j^{th}$ thru pose and places the piece at the goal with the specified $^gT_w$.

Figure 11:
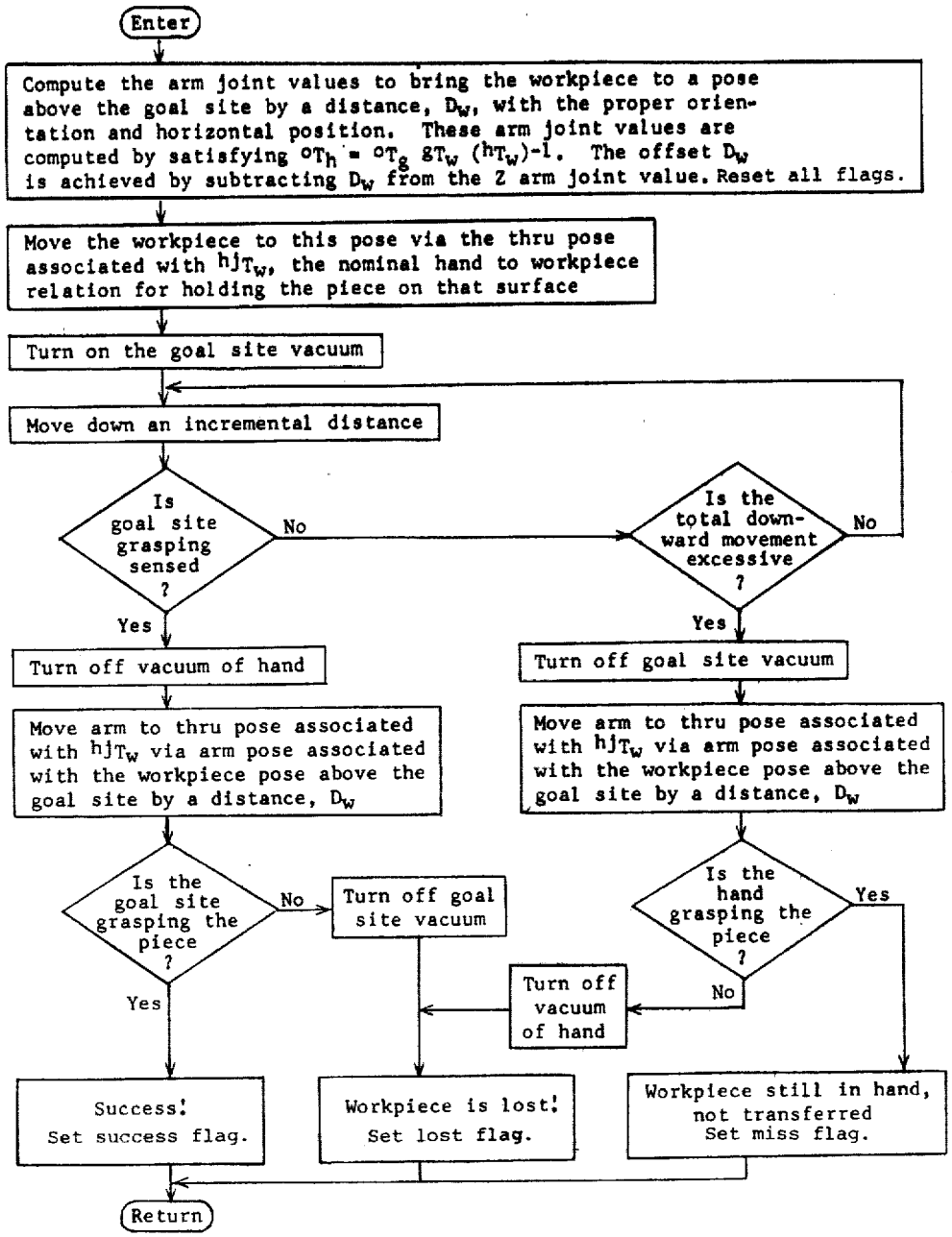
FIGS. 11 and 12 are flow charts of intermediate goal sites.
Figure 12:
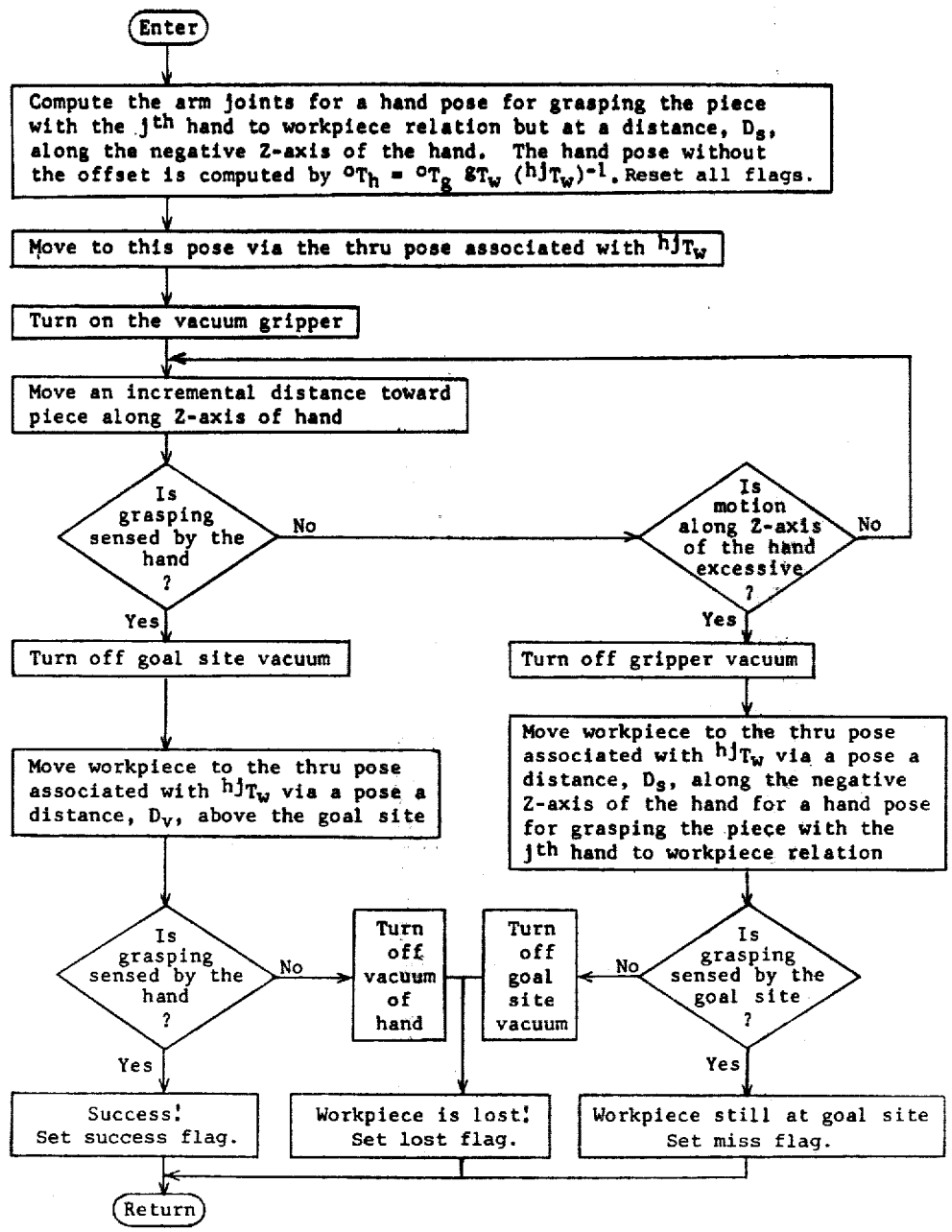

This process is repeated for each of the J ways to grasp the piece. Except for specifying the optional verification poses, it is totally automatic. FIGS. 11 and 12 are flowcharts of the algorithms to place a piece at and acquire a piece from an intermediate goal site.

Once a workpiece is oriented and positioned at the goal sites, it is fed to the final goal site. In this embodiment, the workpiece is fed in one of two ways. Either the robot assembly 20 picks up the insertion tool 102 and transports the piece on it to the final goal site (FIG. 7) or the robot assembly hand picks up the insertion tool 102, moves it to pick up the piece at the regrasping station 110, and then transports the piece to the final goal site (FIG. 8).

Thus, several additional sets of arm joint values must be specified during instruction:

1. Path to pick up insertion tool
2. Path to pick up piece at regrasping station
3. Path to place piece in final goal site The path to the insertion tool is independent of the workpiece. The path to pick up the piece at the regrasping station and the path to place the piece in the machine are dependent on the workpiece.

Execution is the period during which the task described in the instruction is performed. Execution phase consists of three major activities: (a) acquiring a workpiece from a bin; (b) determining workpiece orientation in the hand; and, (c) placing the piece at a goal site.

Figure 9:
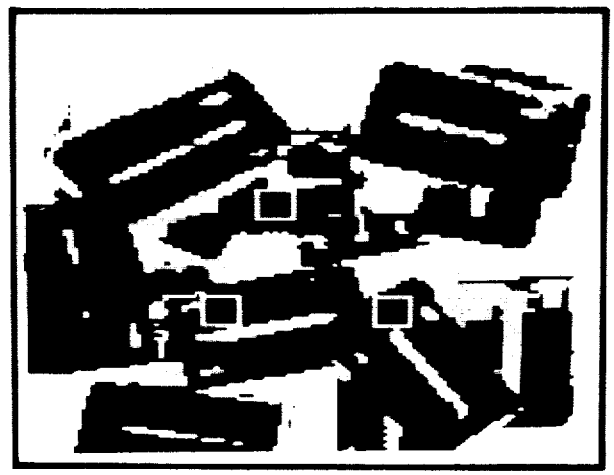
FIG. 9 is a representation of an image of candidate holdsites on workpieces in a bin.

For workpiece acquisition, the following program is used:

Workpiece acquisition begins with the selection of candidate hold sites in the bin. The algorithm selected for initial investigation determines solid square regions of a specified size which are a specified distance apart. A typical image of a bin is shown in FIG. 9. Solid regions in a binary image as shown usually correspond to workpiece surfaces without holes or grooves. Therefore, by identifying solid regions, (as previously described) surfaces on which a vacuum cup may grasp a piece are identified as candidate holdsites.

The robot assembly moves to the bin view pose. A binary image is formed using the arm camera 42 and solid regions in the image are located. The solid region closest to the center is initially selected for attempting acquisition. In this embodiment, the vacuum cup 28 is flexibly mounted to the wrist to accomodate a surface angle upon contact. The location of a solid region in the image is converted to base coordinates using a conversion from pixels to encoder counts and a pair of absolute locations in the arm and image coordinates.

Following visual analysis, the assembly 20 moves to the descent pose over the selected site. The hand 26 is then unlocked. The hand descends vertically until either contact with a workpiece is sensed or until the bin floor is reached. In the latter situation, the assembly returns to the descent pose. If contact is sensed, the vacuum is turned on and the hand continues to descend slowly until either grasping is sensed or until the hand is moved downwardly a fixed distance.

Following successful acquisition of a workpiece from the bin, workpiece orientation in the robot hand is found. First, the robot assembly 20 moves to the presentation pose (FIG. 6) and a check is made to ensure that the piece is still being grasped. If the piece was not dropped, a binary image is formed using the work station camera 44 and the image features are computed.

The features are matched to the feature models stored during instruction for each of the J hand-workpiece relationships. If no high quality feature match is found, the arm moves to the supply bin drop-off pose, releases the piece, and the system returns to the beginning of the execution sequence. If the features do have a high quality match with one or more of the models, the model with the best match is selected. Since each model is associated with a particular hand-workpiece t-matrix, $^hT_w$, the only orientation information which needs computing is the workpiece spin angle perpendicular to the hand surface and translation in the hand surface plane. The translation terms can be computed by determining the shift of the center of gravity of the execution phase features which matched the model's features relative to the center of gravity of the matched model features.

The spin angle may be computed by determining the shift of the axis with the minimum moment of inertia of a binary image of a workpiece. Polarity of the axis may be determined by matching partial areas which are registered relative to the center of gravity and the axis with the least moment of inertia.

To compute the relationship of the workpiece to the hand the following formulars may be used:

$$(^hT_w)_i = (^hT_c)_i {}^cT_w$$

$$(^hT_w)_e = (^hT_c)_e (^hT_c)_i^{-1} (^hT_w)_i$$

$^hT_w$ = t-matrix hand to workpiece relationship during instruction. (known because the hand and coordinate systems are defined during instruction).

$^hT_c$ = t-matrix of the hand to central coordinate system (the central coordinate system has its origin in a plane which is perpendicular to the optical axis and passes through the origin of the hand coordinate system. The location of the origin in that plane is determined by the ray which passes through the centroid of the binary image. The Z axis of the central coordinate system is parallel to the optical axis. The Y axis of the central coordinate system is in line with the axis with minimal moment of inertia of the binary image.

$^cT_w$ = t-matrix which relates the central coordinate system to the workpiece coordinate system.

i = during the instruction phase.

e = during execution phase.

t-matrix is defined as follows:

$$^0T_n = \begin{matrix} X_0 \cdot X_n & X_0 \cdot Y_n & X_0 \cdot Z_n & {}^0x_n \\ Y_0 \cdot X_n & Y_0 \cdot Y_n & Y_0 \cdot Z_n & {}^0y_n \\ Z_0 \cdot X_n & Z_0 \cdot Y_n & Z_0 \cdot Z_n & {}^0z_n \\ 0 & 0 & 0 & 1 \end{matrix}$$

where $X_0 \cdot X_n$, etc., is a dot product and $(^0x_n, {}^0y_n, {}^0z_n)$ are the coordinates of the origin of the n-coordinate system represented in the 0-coordinate system.

Spin and translation are sufficient to compute an updated hand-workpiece t-matrix, $^hT_w$.

Workpiece orientation classification can be verified by examining the workpiece at another orientation. This step is optional and is only performed when two or more image models are very similar. To perform the verification analysis, the workpiece pose established during instruction for the particular finite state (j = 1, .. . ,J) must be restored. The base-hand relationship needed to restore this pose is computed using the following formula:

$$^0T_{he} = {}^0T_{hji} {}^{hj}T_w (^hT_w)^{-1} = {}^0T_{wi}(^hT_w)^{-1}$$

where $^0T_{hji}$ is the hand pose for verification during instruction, $^{hj}T_w$ is the hand-workpiece relationship during instruction, and $^hT_w$ is the hand-workpiece relationship during execution. After computing the arm joint values the arm is moved to the verification pose. A binary image is then input and the verification feature selected during instruction phase, for example, either the area or the center of gravity of the image, is computed. The execution verification feature value is then compared with the corresponding instruction feature value. If the feature values do not match within a specified tolerance, a check is performed to determine if there are any other instruction models which have a high quality match with the execution features. If there is another match, then the spin and translation terms for it are computed, and the verification analysis is repeated.

Other modifications to the invention will be apparent to those skilled in the art. Different types of hands may be used. For the imaging system camera positioning may be varied. For example, the arm camera may be fixed to view the bin(s) at all times and not affixed to the arm.

Two intermediate goal sites have been described for a fuller understanding of the invention. However, once the position of the workpiece is determined at the presentation pose, the robot system may transport the piece directly to a fixed site or reorient in the hand. The sensing of the workpieces, regardless of where located, bin, goal site, etc., may be by non-tactile sensors, such as sensors which receive energy which could provide the necessary data, e.g., sound or light energy; or tactile sensors which would provide the necessary data by contacting the workpiece.

The specific robot assembly described has a define number of axes. The robot arm has been described as including a wrist. The degree of freedom of motion may be divided among the robot assembly and workstation structures to accomplish the necessary movements.

Having described the invention, what we now claim is:

1. A robot system for acquiring unorientated unmodified workpieces from a bin which comprises:
   (a) a robot assembly which includes
      a hand to engage unorientated workpieces stored in the bin, at least some of the workpieces having uncertainty in three angular degrees of freedom for determining candidate holdsites and being structurally distinct from the sensing means; and
      an arm secured to the hand to translate and rotate the hand;
   (b) sensing means to provide data corresponding to the workpieces in the bin which data includes information based on the three angles of uncertainty and is sufficient to allow a candidate holdsite to be determined;
   (c) means to store data corresponding to the relative positions of the bin, the sensing means and the robot assembly, and the data provided by the sensing means; and
   (d) a computer communicating with the robot assembly, the sensing means and the means to store the data which includes
      means to determine the position of the candidate holdsites; and
      means to output data to the robot assembly to move the hand to engage the workpiece at the selective candidate holdsite and to remove subsequently the workpiece from the bin.

2. The system of claim 1 wherein the sensing means is a non-tactile sensor.

3. The system of claim 2 wherein the sensing means is an imaging device.

4. The system of claim 3 wherein the imaging device is a video imaging device.

5. The system of claim 4 which includes means to move the arm through at least six axes one of which is a linear axis.

6. The system of claims 4 or 5 wherein the hand includes vacuum means to engage the workpiece.

7. The system of claim 5 wherein the video imaging device defines an optical axis, the hand is secured to the arm for movement along the linear axis and the optical axis is in parallel alignment with the linear axis.

8. The system of claim 6 wherein the vacuum means includes a flexible vacuum cup extension.

9. The system of claim 6 which includes means to illuminate the workpieces in the bin.

10. The system of claim 1 which includes at least one intermediate goal site, having means to engage the workpiece and wherein the means to store data includes data corresponding to the relative positions of the intermediate goal site, the robot assembly and the engaged workpiece, and the means to output data to the robot assembly includes means to move the workpiece to the intermediate goal site.

11. A robot system for determining the pose of an engaged unmodified workpiece which comprises:
   (a) a robot assembly which includes a hand to engage a workpiece and an arm to translate and rotate the hand;
   (b) sensing means to provide data corresponding to the position and orientation of the workpiece in six degrees of freedom, three of translation and three angles, the workpiece being structurally distinct from the sensing means;
   (c) means to store the data corresponding to the relative positions of the robot assembly and the sensing means, and the data provided by the sensing means; and
   (d) a computer communicating with the robot assembly, the sensing means and the means to store, which includes means to determine the pose of the workpiece and means to output data to the robot assembly to control movement of the workpiece.

12. The system of claim 1 wherein the sensing means is a non-tactile sensor.

13. The system of claim 12 wherein the non-tactile sensor is an imaging device.

14. The system of claim 13 wherein the imaging device is a video imaging device.

15. The system of claim 11 wherein the hand includes vacuum means to engage the workpiece.

16. The system of claims 14 or 15 wherein the video imaging device defines an optical axis, and which includes means to move the arm through at least six axes, one of which is a linear axis and the video imaging device is secured such that its optical axis is in parallel alignment with the linear axis.

17. The system of claim 16 which includes means to illuminate the workpiece.

18. The system of claim 17 wherein the workpiece is illuminated symmetrically about the optical axis.

19. The system of claim 11 which includes at least one intermediate goal site having means to engage the workpieces, the means to store includes data relative to the position of the goal site, the robot assembly and the workpiece; and means to output data to move the workpiece to the goal site.

20. The system of claim 10 wherein the sensing means is a first sensing means which includes
   means to acquire an unoriented workpiece from a bin which means comprises second sensing means to provide data corresponding to the workpieces in the bin which data is sufficient to allow a candidate holdsite to be determined, the means to store includes data corresponding to the relative positions of the bin, the second sensing means; and
   the computer includes means to determine the position of the candidate holdsite and means to output data to the robot assembly to move the hand to engage the workpiece at the selected candidates holdsite and to move the hand to the pose.

21. A method of acquiring unoriented unmodified workpieces from a bin, the workpieces being structurally distinct from a sensing means which collects data, at least some of the pieces having uncertainty in three angular degrees of freedom for determining candidate holdsites which includes:
 (a) collecting data about candidate holdsites by a sensing system, the data including information based on three angles of uncertainty;
 (b) locating a candidate holdsite relative to the hand of a robot assembly, the robot assembly including an arm to translate and rotate the hand;
 (c) moving the hand to engage the selected holdsite; and
 (d) engaging the workpiece.

22. The method of claim 21 which includes collecting the data with a non-tactile sensor.

23. The method of claim 22 which includes collecting the data with an imaging device.

24. The method of claim 23 which includes collecting the data with a video imaging device.

25. The method of claim 24 which includes establishing at least one candidate holdsite from the collected data.

26. The method of claim 25 which includes selecting a candidate holdsite for engagement by the hand.

27. The method of claim 24 which includes matching the collected data with a model of holdsite data, the model corresponding to a desired candidate holdsite.

28. The method of claims 1 or 24 which includes illuminating the unoriented workpieces in the bin.

29. The method of claims 1 or 24 which includes removing the workpiece from the bin.

30. The method of claim 24 wherein the video imaging device defines an optical axis and which includes moving the hand along a linear axis parallel to the optical axis to engage the workpiece.

31. The method of claim 24 wherein the collecting of the data includes
 creating images of the workpieces in the bin;
 setting all pixels whose brightness is below a threshold to zero, the rest to one;
 defining solid regions which relate to the dimensions of the hand; and
 selecting one of said defined regions as the candidate holdsite.

32. The method of claim 24 which includes moving the engaged workpiece to an intermediate goal site; and
 releasing the workpiece at the intermediate goal site from the hand; and
 engaging the workpiece at the goal site.

33. A method of determining the pose of a workpiece which includes:
 (a) engaging an unmodified workpiece with the hand of a robot assembly, the robot assembly including an arm to translate and rotate the hand;
 (b) moving the workpiece relative to a presentation pose;
 (c) collecting data about the pose of the workpiece by a sensing system in six degrees of freedom, three of translation and three angles, the workpiece being structurally distinct from the sensing system; and
 (d) establishing the position and orientation of the workpiece from the collected data.

34. The method of claim 33 wherein the pose is established by:
 storing features of the workpiece image in a plurality of orientations during an instruction phase; and
 comparing the features of the image of the workpiece when it is moved to the presentation pose with the features of the stored workpiece images established during the instruction phase.

35. The method of claim 33 wherein the pose is established by:
 identifying spatial locations of workpiece features from a plurality of views of the workpiece in the presentation pose; and
 comparing these features with a structural model of the workpiece.

36. The method of claim 33 wherein the pose is established by:
 comparing the centroid of the workpiece with the axis having the minimum moment of inertia.

37. The method of claim 33 wherein the data collection includes
 collecting the data with a non-tactile sensor.

38. The method of claim 37 wherein the non-tactile sensor is an imaging device.

39. The method of claim 38 wherein the non-tactile sensor is a video imaging device.

40. The method of claims 33 or 39 which includes engaging the workpiece in a fixed manner.

41. The method of claims 33 or 39 which includes:
 moving the workpiece from the presentation pose to a final goal site.

42. The method of claim 41 which includes:
 releasing the workpiece at the final goal site.

43. The method of claims 33 or 39 which includes:
 moving the workpiece from the presentation pose to an intermediate goal site;
 releasing the workpiece at the intermediate goal site; and
 engaging the workpiece at the intermediate goal site.

44. The method of claim 43 which includes:
 moving the workpiece from the intermediate goal site to a final goal site.

45. The method of claims 33 or 39 which includes acquiring an unorientated workpiece from a bin by collecting data about candidate holdsites,
 locating a candidate holdsite relative to the hand,
 moving the hand to engage the selected holdsite,
 engaging the workpiece, and
 moving the hand to the presentation pose.

* * * * *